United States Patent
Patrick et al.

[11] Patent Number: 6,071,050
[45] Date of Patent: Jun. 6, 2000

[54] FINE FEED ADJUSTMENT FOR MILLING MACHINES AND METHODS RELATING THERETO

[75] Inventors: Michael A. Patrick, Louisville; Richard M. Cook, Denver, both of Colo.

[73] Assignee: Mike Patrick, Louisville, Colo.

[21] Appl. No.: 09/185,928

[22] Filed: Nov. 4, 1998

[51] Int. Cl.⁷ .................................................. B23C 9/00
[52] U.S. Cl. ..................... 409/204; 409/185; 409/206; 408/137
[58] Field of Search .................................. 409/185, 191, 409/204, 206, 210, 214, 235; 408/137, 234

[56] References Cited

U.S. PATENT DOCUMENTS

| | | | |
|---|---|---|---|
| 1,193,240 | 8/1916 | Coulter | 408/137 |
| 1,889,653 | 11/1932 | Gorton | 409/185 |
| 2,066,217 | 12/1936 | Moo | 409/206 |
| 2,283,154 | 5/1942 | Koch | 409/206 |
| 2,342,829 | 2/1944 | Armitage | 90/17 |
| 2,363,115 | 11/1944 | Brocklebank | 90/16 |
| 2,571,793 | 10/1951 | Turner et al. | 409/185 |
| 2,901,946 | 9/1959 | Grabes | 409/185 |
| 2,984,159 | 5/1961 | Schurger et al. | 90/14 |
| 3,064,540 | 11/1962 | Frushour et al. | 90/14 |
| 3,162,091 | 12/1964 | Keller | 409/144 |
| 3,283,619 | 11/1966 | Marchis | 409/185 |
| 3,373,658 | 3/1968 | Larsen | 409/231 |
| 3,640,147 | 2/1972 | Fantoni | 408/137 |
| 3,760,765 | 9/1973 | Scott | 116/115 |
| 4,239,428 | 12/1980 | Berzina | 409/182 |
| 4,521,144 | 6/1985 | Ginter | 409/218 |
| 4,574,441 | 3/1986 | Kronfeld | 29/57 |
| 4,660,942 | 4/1987 | Hill | 350/521 |
| 4,787,794 | 11/1988 | Guthrie | 411/433 |
| 4,896,857 | 1/1990 | McCullough | 24/279 |
| 4,909,683 | 3/1990 | Vershowske et al. | 409/218 |
| 5,106,242 | 4/1992 | Obrecht et al. | 408/241 |
| 5,195,853 | 3/1993 | Dooley | 408/137 |
| 5,252,010 | 10/1993 | Obrecht et al. | 408/241 |
| 5,286,147 | 2/1994 | Esobedo et al. | 409/218 |
| 5,330,298 | 7/1994 | Welch et al. | 409/80 |
| 5,628,594 | 5/1997 | Fetty | 409/144 |
| 5,941,663 | 8/1916 | Elrod et al. | 409/185 |

Primary Examiner—Andrea L. Pitts
Assistant Examiner—Erica Ergenbright
Attorney, Agent, or Firm—Sheridan Ross P.C.

[57] ABSTRACT

A fine feed adjustment adapter for new milling machinery or retrofitted to existing milling machines is used in order to obtain adjustments of between ¼ and ¹⁄₁₀,₀₀₀th of an inch along the z-axis. The fine feed adjustment mechanism does not interfere with the preexisting coarse, vertical adjustment arm which is standard on commercial milling machines.

16 Claims, 3 Drawing Sheets

FINE FEED ADJUSTMENT FOR MILLING MACHINES AND METHODS RELATING THERETO

FIELD OF THE INVENTION

The present invention is directed to a fine feed adjustment adapter for milling machinery, and more particularly, is directed to a device to retrofit existing milling machines in order to repeatedly obtain adjustments of between ¼ (0.250) and ¹⁄₁₀,₀₀₀th (0.001) of an inch along the z-axis.

BACKGROUND OF THE INVENTION

Milling machines, commonly used by operators for milling items, such as metal, plastic or wood are available in various forms and from various manufacturers. The majority of milling machines include a head assembly which includes a spindle and a quill. The spindle holds a milling tool used for milling a workpiece and the head assembly includes a spindle motor for causing the spindle to rotate within the quill. The quill and spindle is typically movable along a third axis of movement which is perpendicular to the first and second axes of movement, such third axis generally defined by a vertical line extending in both directions through the center of the spindle. Milling machines are generally operated in substantially three modes: manual operation; and computer controlled or aided two axis operation and computer controlled or aided three axis operation. In manual operation, a milling machine operator manually turns x or y cranks to desirably position the workpiece, often tracking the movement via position indicating dials, electronic readouts or other similar means. In this way, a workpiece can be manually moved relative to the rotating spindle within the quill to an appropriate location for desired machining. In two or three axes computerized numerically controlled or aided (CNC) milling machines, programmed positioning is provided along either two or three axes of motion. In two axis computer controlled or aided machine, a computer typically receives position information from an operator or from a stored program and controls the positioning of the machine along the axes of motion to a desired position based on the position information received. Movement of the quill along the third axis, or z-axis, is typically left to be manually operated.

In a three axis machine computer controlled or aided, movement of the quill along the third axis is also automated. Dedicated three axis milling machines are more expensive and are not suitable for the production of one or a few prototype workpieces given the time and effort required to properly program such machines to produce a particular desired workpiece.

In normal operation of a manual or two axis computer controlled or aided milling machine, a workpiece is manipulated into a desired position relative to a tool mounted in a spindle, for example, by an operator turning hand cranks so that the table holding the workpiece moves along x and y axes of movement to a desired position relative to the spindle or by computer controlled or aided. Once adequately positioned, the operator mills or drills the workpiece with the tool by manually rotating an adjustment lever about an axis of rotation adjusting the depth of cut causing the quill to move vertically downward along the z-axis of movement. The tool mounted within the spindle contacts the workpiece as the spindle rotates within the quill.

In prior embodiments of 3 axis computer controlled or aided machines, servo motors have been used to move the quill in the z-axis, such motors substantially interfering with the ability of an operator to manually position the quill along the z-axis.

Other prior inventors have attempted to alleviate this problem by providing various quill control mechanisms, for example, Welch et. al, U.S. Pat. No. 5,330,298 teaches the positioning of controlling elements so that both manual positioning of the quill and automatic positioning of the quill can be achieved. Welch et. al fails to provide, however, a fine feed adjustment mechanism to enable an operator to manually adjust the quill along the z-axis with the precision, speed and efficiency required in commercial operations, for example, the production of one or a few prototype workpieces. Still other prior inventors have conceived of position indicating mechanisms. For example, Vershowske et. al, U.S. Pat. No. 4,909,683 describes a scale adapted to provide a highly accurate digital readout of the linear position of a quill. Vershowske et. al, however, must still rely upon the manual ability of an operator to properly control the existing coarse lever control on existing milling machines in an attempt to achieve the desired vertical movement, regardless of how well the vertical movement is indicated on a positioning mechanism. In other words, reliance upon the existing coarse vertical adjustment mechanisms on existing machines is insufficient to provide repeatable and accurate operation of a milling machine to small tolerances, regardless of the degree of accuracy of the readout provided.

Still other inventors have conceived of stop assemblies for milling machines to provide quick and accurate adjustments of a stop assembly setting (see, for example, Obrecht et. al, U.S. Pat. Nos. 5,252,010; 5,106,242; Ginter, U.S. Pat. No. 4,521,144; Kronfeld, U.S. Pat. No. 4,574,441; Guthrie, U.S. Pat. No. 4,787,794). Others disclose adapters for mounting depth gauges onto milling machines (Escobedo et. al, U.S. Pat. No. 5,286,147). All previously existing milling machines suffer, however, from a particular shortcoming in that none of them provides for a way in which to easily provide a fine feed mechanism in the z-axis which allows an operator to manually gauge depth within ¹⁄₁₀,₀₀₀th of an inch without the need for complicated and time consuming adjustment of automatic/computer operated controls and still maintain coarse adjustment functions.

Thus, none of the prior art devices is suitable for the production of one or a few number of prototypes in a cost effective and time efficient manner. A long-felt but unsolved need therefore exists for a fine feed adjustment mechanism that is preferably retrofittable to existing machines, that is relatively inexpensive, easy to operate, and that does not interfere with the original operation of the handles provided on existing machines for more coarse adjustment of a quill along the z-axis. The present invention, as described in greater detail below, provides a solution to this long-felt but unsolved need.

SUMMARY OF THE INVENTION

One aspect of the present invention relates to an add-on accessory device adapted to be retrofitted to conventional milling machines for conveniently enhancing precision adjustments along the z-axis. Partial disassembly and then reassembly of an operator's original equipment is required to properly fit the present device to the milling machine. The present invention is useful on a variety of machines which require an adjustment of the depth of a "downfeed" spindle, including manual drill presses and other types of "Bridgeporttype" vertical turret milling machines.

The fine feed adapter device of the present invention attaches to the existing hub on milling machines, such hub connected to a lever handle which, upon operation of the lever and rotation of the hub, vertically manipulates the quill up and down. A regular handle length on existing machines is approximately 9 inches long. The fine feed adapter device of the present invention thus allows an operator to finely adjust the vertical feed and therefore attain exact desired depths of a tool into a workpiece. The present device is particularly useful for machines equipped with a digital depth readout and can dramatically reduce the amount of time necessary to make precise adjustments to milling machines in order to produce a prototype workpiece. Moreover, all functions of the original handle are still available to the operator, since the present fine feed adapter of the present invention retrofits between the handle and the hub, keeping the original handle for use in more coarse vertical adjustments of the quill.

DETAILED DESCRIPTION OF THE PREFERRED EMBODIMENT

Figure 1:
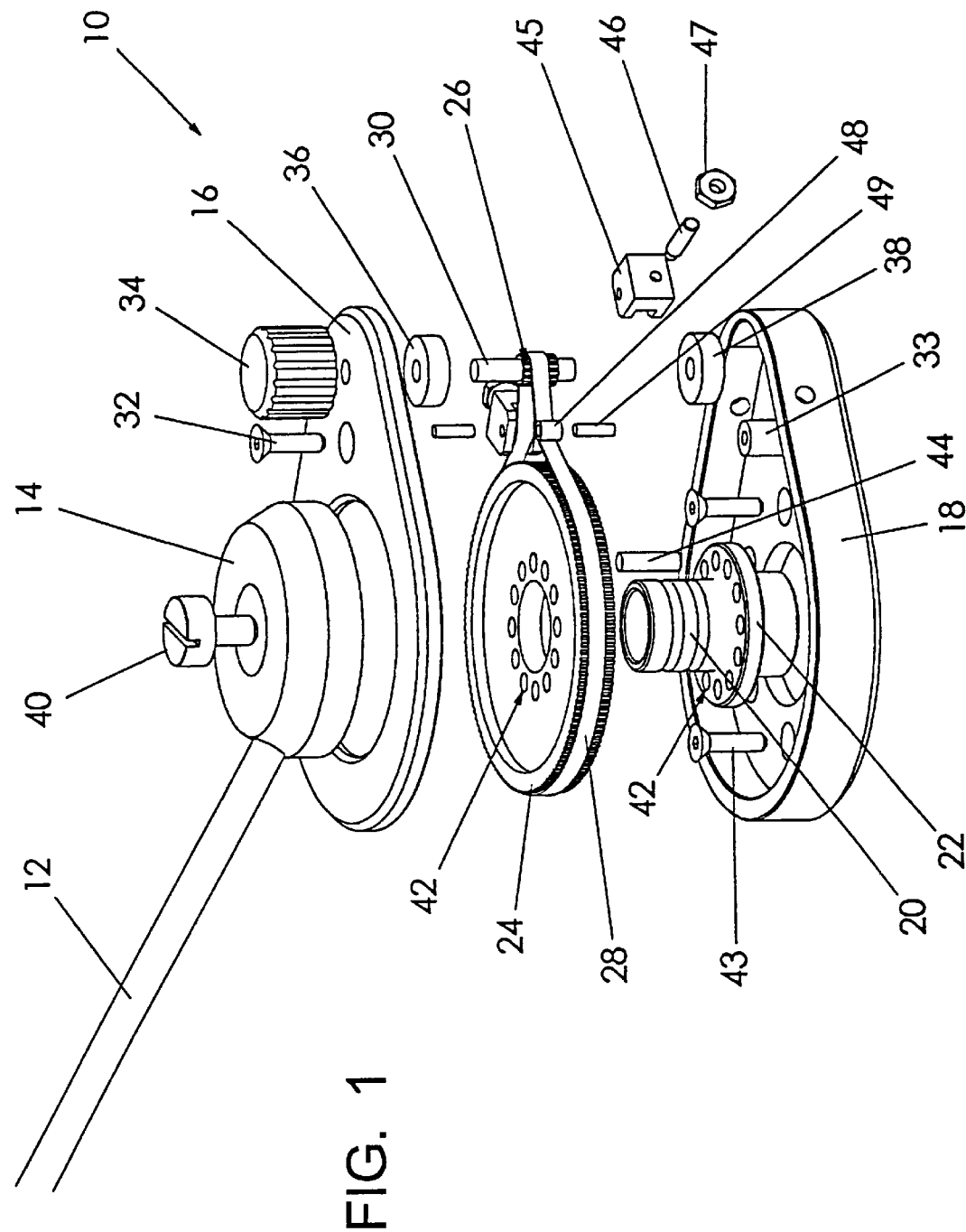
FIG. 1 illustrates the fine feed adjustment device of the present invention.
Figure 2:
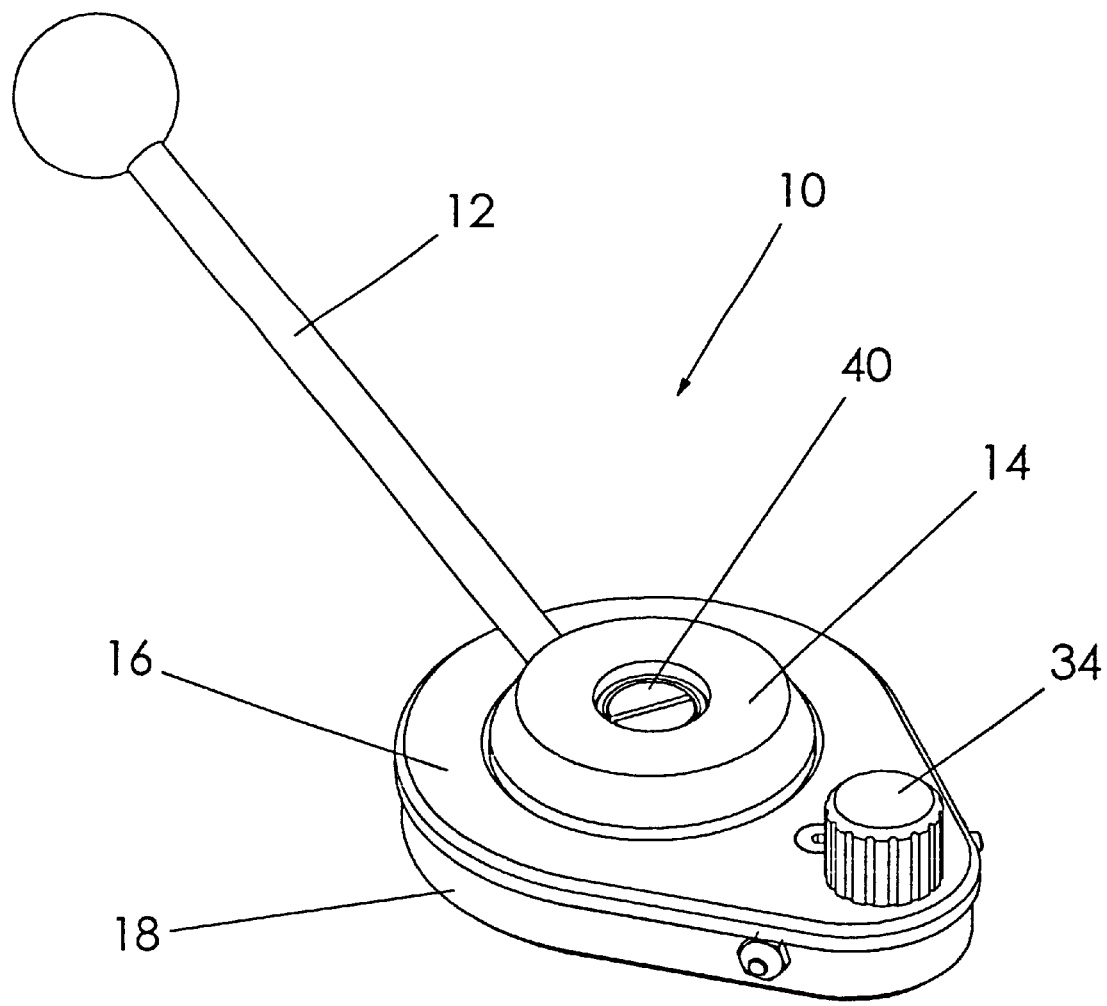
FIG. 2 shows a perspective view of the present invention in an assembled state and connected to a standard lever handle.
Figure 3:
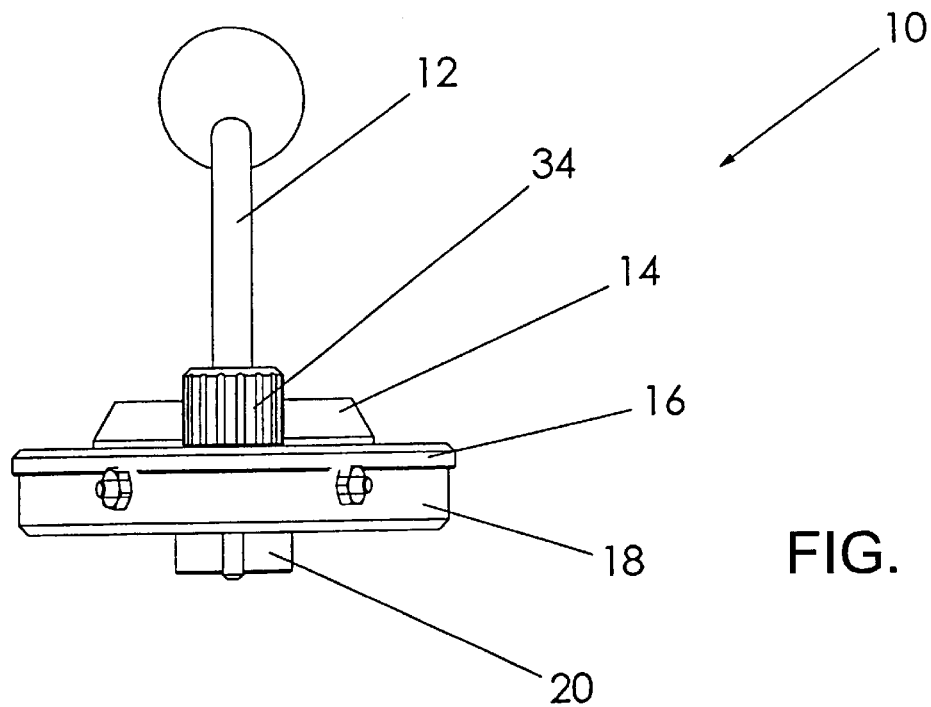
FIG. 3 is a side view of the device illustrated in FIG. 2.
Figure 4:
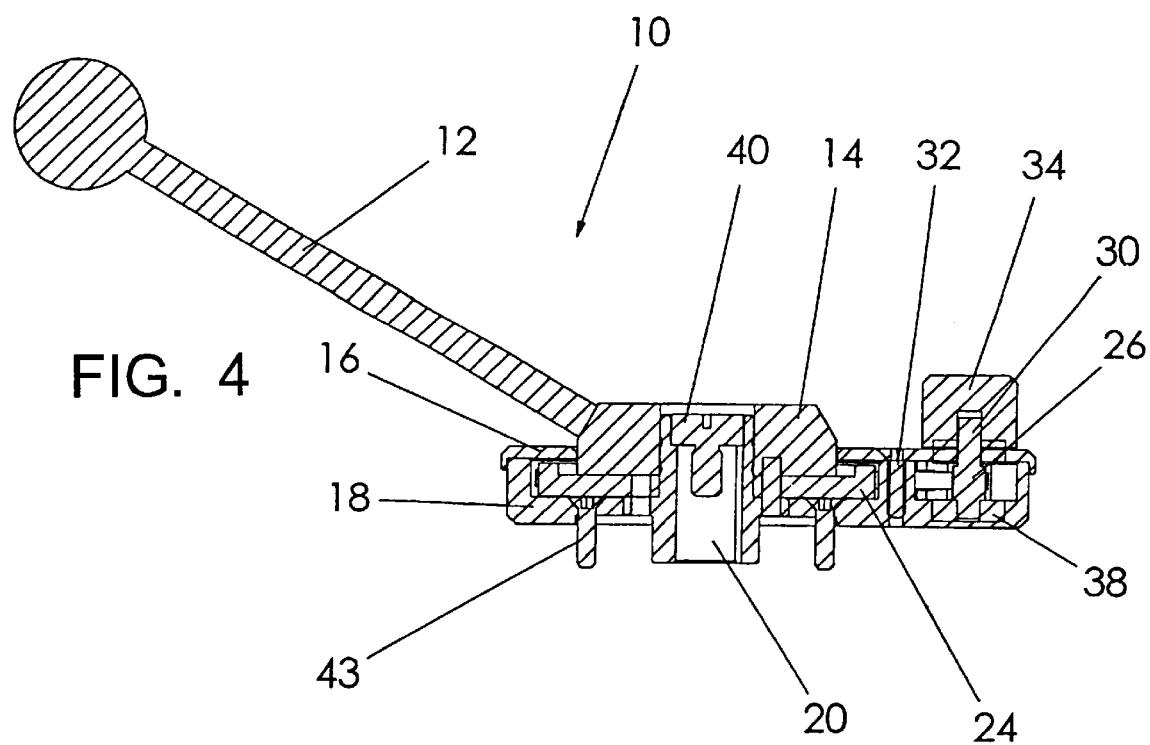
FIG. 4 is a cutaway side view of the device as pictured in FIG. 2.

The present invention is particularly directed to a milling machine fine precision adjustment device 10 which allows an operator to control the z-axis vertical movement of a quill, down feed spindle, and a tool attached thereto so that the operator can expeditiously produce one or a few milled workpieces by setting the cut quickly and precisely utilizing either a manual or computer operated machine. This avoids the prospect of improperly milling a workpiece due to the inability of existing one and two axis machines to repeatedly produce the exact depth of cut necessary to produce precision constructed workpieces. The coarse adjustment lever 12, which is standard on existing machines, simply does not permit fine adjustment of the milling machine in the z-axis. The present invention satisfies this long felt, but hitherto unsolved need without the expenditure of significant time using hunt-and-peck, empirical methods to arrive at an acceptable milled workpiece. In brief, the present invention provides an operator with a device that can quickly and precisely mill a workpiece to exacting specifications while still maintaining the ability to operate a coarse feed mechanism to adjust the z-axis.

In one aspect of the present invention, a milling machine fine precision adjustment device 10 is provided having a first rotatable component 24 (e.g., a large gear) capable of being attached to a milling machine at a point adjacent and/or beneath the standard lever handle that controls vertical movement of the quill. The milling machine shaft is capable of being manually rotated to move the shaft in a substantially vertical direction via a first manual quill adjuster 12 (e.g., the standard lever handle). A second rotatable component 26 (e.g., a small gear) has an axis of rotation different from that of the first rotatable component 24. The first and second rotatable components 24, 26 are operatively connected so that a full rotation of the second rotatable component 26 causes less than a full rotation of the first rotatable component 24. A second manual quill adjuster 34 (e.g., a fine adjustment knob) is operatively connected to the second rotatable component 26 for rotating the second rotatable component 26. When an operator of the milling machine manually moves the first manual quill adjuster 12 so that the quill is moved downwardly, thereby providing an approximation of a desired position of the quill, the operator can then move the second manual quill adjuster 34 to provide a more precise positioning of the quill relative to the workpiece.

As illustrated in FIG. 1 a standard lever handle 12 of a milling machine is connected to a circular hub 14 which rotates around a central axis 20, thereby vertically adjusting the quill of the milling machine relative to a workpiece. The device of the present invention is inserted between the lever handle hub 14 on existing machines and the milling machine itself to thereby provide a device for fine adjustments in the vertical direction of the quill.

In one embodiment, the present device consists of a housing 16, 18, preferably consisting of two substantially equally shaped compartments 16, 18 held together by a screw 32 which connects to a threaded nut 33 on the opposing housing side 18, as well as a screw 40 that connects the lever hub 14 to the device 10. The housing 16, 18 is preferably in an oblong or egg-shaped configuration with the wider portion of such configuration made to accommodate the lever handle hub 14 of existing machines, whereas the narrow portion of such configuration accommodates a fine adjustment knob 34. The knob 34 is rotatable on a bearing 36. Inside the housing 16, 18 is positioned a large gear 24, such gear positioned substantially along the axis of rotation 20 of the lever handle hub 14. A second smaller gear 26 is provided in the narrow most portion of the housing 16, 18 and is attached to the fine adjustment knob 34 and rotates about a small gear axis 30. A set of bearings 36, 38 may be placed under and over the small gear 26 to hold it in place along an axis of rotation 30 of the fine adjustment knob 34. The large gear 24 attaches to the connection plate 22 via one or more pins 44 which may include an existing pin 44 from the lever handle assembly 14, and the existing machine hub 14 is secured with a large screw 40.

With the large gear 24 fitting over an existing rotation hub 20 of a conventional milling machine, rotation about such hub 20 raises and lowers the quill/spindle by vertically adjusting the shaft of the milling machine. The large gear 24 is attached to the milling machine hub 20 in such a manner that the large gear 24 rotates with the milling machine hub 20 whenever the lever handle 12 is manipulated.

Connecting the large gear 24 to the small gear 26 is a toothed band 28 which engages the gear teeth of the large gear 24 as well as the gear teeth of the small gear 26. Rotation of the large gear 24 thus operates to rotate the small gear 26 and vice versa. Rotation of either of these gears 24, 26 will vertically adjust the quill/spindle along a vertical direction. Obviously, adjustment of the fine adjustment knob 34 will operate to vertically adjust the quill/spindle over small distance increments whereas movement of the large gear 24 via the standard lever handle 12 hub rotation 20 will vertically adjust the quill/spindle along larger vertical distances. Tensioning assembly rollers 48 are positioned within the housing 16, 18 and come into contact with the belt 28 to provide for tension adjustment of the belt 28 as it moves around the large 24 and small gears 26. By adjusting the tension of the belt 28, for example, by screwing the tensioning devices 48, (which rotate about a pin axis 49) back and forth as relates to the housing 18 to which it is secured, an operator is able to easily release tension to remove or replace a toothed band 28 and once installed, the toothed band 28 can be appropriately adjusted so that a proper feel of the adjustment knob 34 is achieved. The tensioning device roller 48 thus provide a frictional restraint on the toothed band 28. The contact of the roller 48 mechanism, rotatably housed within a tensioning device housing 45, (such device having a threaded pin 46 and a nut 47 associated therewith) is movable back and forth in relation to the tensioning device housing 45. For example, the pin 46 can be accessible by an operator from the exterior of the housing 16, 18 and the rotation thereof causes the roller 48 to contact the band 28.

The housing 16, 18 is designed to maintain the first 24 and second 26 rotative components in a desired operational orientation to one another so that rotational movement is transferred therebetween. The housing 16, 18 preferably includes an opening for receiving the standard hub 22 which attaches to the lever handle hub 14. The housing 16, 18 is then fixedly positioned relative to the milling machine itself with existing or supplied screws 43 into existing tapped holes. The housing 16, 18 therefore has an interior compartment containing at least the first rotatable component 24 and the second rotatable component 26. While in some embodiments the first rotatable component 24 (e.g., the large gear) and the second rotatable component 26 (e.g., the small gear) are connected with a toothed band 28 as described above, any acceptable rotational movement transfer components can be used to transfer the rotational movement between the first 24 and second 26 rotatable components. Indeed, a gear to gear interaction whereby the teeth of a large gear interact with the teeth of a small gear and replace the toothed band may even be preferable in various instances. In other embodiments, a gear within a gear arrangement can be utilized wherein, for example, a large gear would have teeth on its inside diameter and a small gear would be positioned within the confines of the large gear diameter with teeth along the small gear's periphery. In such a manner, the rotation of the small gear would cause the outer periphery teeth of the small gear to interact with the inner periphery teeth of the large gear, causing the desired rotational movement and thus, desired z-axis movement of the quill.

Still further embodiments of the present invention do not utilize gears but instead, rely upon frictional contact between two rotating elements. For example, a large rotating element can be contacted by a smaller rotating element, such smaller rotating element having a rubberized surface that contacts the larger rotating element, such that when the smaller rotating element is rotated, the rubberized contact with the large rotating component also causes such large component to rotate. The particular size and shape of any rotatable component may vary depending upon the particular uses and machinery employed. Moreover, it is also within the scope of the present invention that one or more rotating components are interconnected through means other than frictional and/or gear-toothed relationships, for example, electrically and/or magnetically interconnected to accomplish the sought-after fine-feed adjustment mechanism rotation. For example, a full rotation of a small rotatable component could cause a 1/60th of a rotation of a larger component to which the smaller rotatable component is connected.

The toothed band 28, in one embodiment, comprises a flexible closed loop 28 extending about the circumference of both the first 24 and second 26 rotatable components. In alternative embodiments (not shown), the rotational movement transfer components include a rigid member that rotates about an axis different from both the axis of rotation for the first rotatable component and the axis of the second rotatable component (e.g., a third, fourth, etc. gear can be placed between the large and small gears).

Another aspect of the present invention relates to a method for providing a fine precision adjustment of a milling machine quill relative to a workpiece comprising removing a manual quill adjustment component from a fully assembled milling machine, thereby providing access to a free end of a quill adjustment shaft whose rotation causes vertical movement of a quill. The quill adjustment shaft 20 is inserted through an opening in the housing 16, 18 to align the present adjustment assembly 10 with the quill adjustment shaft 20. A first rotatable component 24 (e.g., large gear) of the adjustment assembly 10 is then secured to a quill adjustment shaft 20 by aligning holes 42 of the first rotatable component 24 with holes 42 in the connection plate 22 by means of a pin 44. A second rotatable component 26 (e.g., small gear) is operably connected to the first rotatable component 24 so that when the second rotatable component 26 rotates to adjust the vertical direction of the quill over substantially small distances (e.g., between about ¼ inch and 1/10,000th inch) the first rotatable component 24 is rotated slightly, thus moving the quill vertically by the desired small amount. Manual rotation of the manual quill adjustment component 12 (e.g., the lever handle) rotates the quill adjustment shaft and thereby provides an approximation of a desired position of the quill along the z-axis. Finally, manual movement of the second quill adjustment component 34 (e.g., the fine adjustment knob) allows the operator to precisely adjust the vertical movement of the quill due to the fact that a full rotation of the second rotatable component 34, 26 causes less than an entire rotation of the first rotatable component 24. In this manner, fine adjustment of vertical positioning of the quill relative to a workpiece is accomplished.

While the above discussion was directed to conventional milling machines which have a table upon which the workpiece is secured movable in an x and y direction and the spindle is moved solely in a z-axis direction and not in an x-y axis direction, other embodiments that will be obvious to one of skill in the art given the guidance and direction of the present specification, include the use of the present invention for various other machines, such as routers, cutting, molding, and shaping machines, wherein the tool itself is movable in various directions. In brief, the present invention can be used with various cutting and tooling machines to provide a fine-feed adjustment mechanism that works in concert with the coarse feed adjustment mechanism available on conventional machinery.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A milling machine fine precision adjustor of a quill relative to an object for milling, comprising:

a first rotatable component capable of being attached to a shaft of a milling machine, wherein the milling machine shaft is manually rotated to move said shaft in a substantially vertical direction via a first manual quill adjustor, to move said quill relative to the object to be milled;

a second rotatable component having an axis of rotation different from that of said first rotatable component, wherein said first and second rotatable components are operably connected so that a full rotation of said second rotatable component causes less than a full rotation of said first rotatable component;

a second manual quill adjustor operably connected to said second rotatable component for rotating said second rotatable component;

wherein after an operator of the milling machine manually moves the first manual quill adjustor to an approximation of a desired position of the quill, the operator is capable of moving said second manual quill adjustor for providing a more precise positioning of the quill relative to the object.

2. A milling machine fine precision adjustor as claimed in claim 1, further including a housing for maintaining said first and second rotatable components in a desired operational orientation to one another for transferring rotational movement therebetween.

3. A milling machine fine precision adjustor as claimed in claim 2, wherein said housing includes an opening for receiving the shaft, said housing being fixedly positioned relative to said milling machine.

4. A milling machine fine precision adjustor as claimed in claim 3, wherein said housing has an interior containing at least one of said first rotatable component and said second rotatable component.

5. A milling machine fine adjustor as claimed in claim 4, further including a rotational movement transfer component for transferring rotational movement between said first and second rotatable components.

6. A milling machine fine precision adjustor as claimed in claim 5, wherein said rotational movement transfer component includes a flexible closed loop extending about a circumference of both said first and second rotatable components.

7. A milling machine fine precision adjustor as claimed in claim 5, wherein said rotational movement transfer component includes a rigid member that rotates about an axis different from both an axis of rotation for said first rotatable component and an axis of rotation for said second rotatable component.

8. A milling machine fine precision adjustor as claimed in claim 5, wherein said second rotatable component includes a second shaft rotatable about said second axis of rotation, and wherein said second shaft transfers rotational movement between said rotational movement transfer component and said second manual quill adjustor.

9. A milling machine fine precision adjustor as claimed in claim 1, further including at least one tensioning device to adjust an ease of rotational movement of the second rotatable component.

10. A milling machine fine precision adjustor as claimed in claim 1, wherein said second manual quill adjustor includes a manually-rotatable knob.

11. A milling machine fine precision adjustor as claimed in claim 1, wherein at least one of said first and second rotatable components includes a toothed gear.

12. An accessory device adapted to be retrofitted to a conventional milling machine, comprising:

a large gear having a first diameter;

a small gear having a second diameter, said second diameter being smaller than said first diameter;

means for connecting said large gear and said small gear such that when said small gear is rotated, said large gear is also rotated;

a housing encompassing said large gear and said small gear;

a knob operatively connected to said small gear;

whereby when said device is retrofitted to a milling machine beneath a standard lever hub, fine precision vertical adjustment of the milling machine is accomplished by rotation of said knob.

13. The device as set forth in claim 12, wherein said means for connecting comprises a toothed loop.

14. The device as set forth in claim 12, wherein said first diameter is at least twice as large as said second diameter.

15. The device as set forth in claim 12, wherein said device allows an operator to vertically move a quill on said milling machine in a vertical axis over a range of distances ranging from between about ¼ inch to ¹⁄₁₀,₀₀₀th of an inch.

16. The device as set forth in claim 12, wherein said device further comprises a tensioning device for adjusting a tension of the said connecting means.

* * * * *